US 8,045,960 B2

(12) United States Patent
Orakkan

(10) Patent No.: US 8,045,960 B2
(45) Date of Patent: Oct. 25, 2011

(54) INTEGRATED ACCESS CONTROL SYSTEM AND A METHOD OF CONTROLLING THE SAME

(75) Inventor: Binu Orakkan, Kerala (IN)

(73) Assignee: Honeywell International Inc., Morristown, NJ (US)

( * ) Notice: Subject to any disclaimer, the term of this patent is extended or adjusted under 35 U.S.C. 154(b) by 467 days.

(21) Appl. No.: 11/755,919

(22) Filed: May 31, 2007

(65) Prior Publication Data

US 2008/0298297 A1 Dec. 4, 2008

(51) Int. Cl.
*H04M 1/66* (2006.01)
(52) U.S. Cl. ............... 455/411; 455/440; 455/456.1; 455/456.6; 455/432.3; 340/5.8
(58) Field of Classification Search ............ 455/440, 455/432, 411, 421, 456.6, 432.3; 370/316; 340/5.8
See application file for complete search history.

(56) References Cited

U.S. PATENT DOCUMENTS

| | | | | |
|---|---|---|---|---|
| 6,072,402 | A * | 6/2000 | Kniffin et al. | 340/5.28 |
| 6,394,356 | B1 * | 5/2002 | Zagami | 235/487 |
| 6,720,861 | B1 * | 4/2004 | Rodenbeck et al. | 340/5.64 |
| 6,978,023 | B2 * | 12/2005 | Dacosta | 380/258 |
| 7,312,752 | B2 * | 12/2007 | Smith et al. | 342/464 |
| 2002/0077996 | A1 * | 6/2002 | Regelski et al. | 707/1 |
| 2003/0004792 | A1 * | 1/2003 | Townzen et al. | 705/13 |
| 2003/0033388 | A1 * | 2/2003 | Hom et al. | 709/220 |
| 2003/0071715 | A1 * | 4/2003 | Lavelle et al. | 340/5.5 |
| 2004/0113753 | A1 * | 6/2004 | Chen | 340/5.7 |
| 2004/0208151 | A1 * | 10/2004 | Haverinen et al. | 370/338 |
| 2005/0055568 | A1 * | 3/2005 | Agrawala et al. | 713/200 |
| 2005/0095885 | A1 | 5/2005 | Lindner | |
| 2005/0171787 | A1 * | 8/2005 | Zagami | 705/1 |
| 2006/0058024 | A1 | 3/2006 | Manner et al. | |
| 2006/0139155 | A1 | 6/2006 | Kim | |
| 2007/0055776 | A1 | 3/2007 | Hom et al. | |
| 2008/0194201 | A1 * | 8/2008 | Sinivaara et al. | 455/41.2 |

FOREIGN PATENT DOCUMENTS

WO WO 01/091038 11/2001

* cited by examiner

*Primary Examiner* — Jinsong Hu
*Assistant Examiner* — Qun Shen
(74) *Attorney, Agent, or Firm* — Husch Blackwell

(57) ABSTRACT

An access control system including a base station located near a stationary target site used to control access to the stationary target site and satellite access station coupled to the exterior of a satellite target site used to control access to the satellite target site. The base station includes an identification device, storage device, a control unit, a user interface and a transceiver. A master database containing a list of access information for all of the satellite access stations is stored in the storage device. Each satellite access station includes a second identification device, a second storage device, a control unit and a second transponder. A satellite database contains a list of access information for the satellite target site. Information contained in the master database for a particular satellite access station is provided to the particular satellite access station and stored in the satellite database.

10 Claims, 8 Drawing Sheets

INTEGRATED ACCESS CONTROL SYSTEM AND A METHOD OF CONTROLLING THE SAME

BACKGROUND OF THE INVENTION

1. Field of the Invention

This invention generally relates to communication systems and access control systems. More particularly, the invention relates to a method and system for controlling access to multiple target areas using a base station and at least one satellite access station, where the base station can be used to update data in the at least one satellite access station.

2. Background

Access control systems are used to limit access to target areas. Access control systems typically include an identification device that is capable of receiving input related to the identity of an individual, such as a unique code. The identification device determines whether an individual that corresponds to the input is authorized to enter the target area. If the input data, e.g., key code or input data, matches data that is prestored, the individual is allowed to enter the targeted area. For example, a lock on a door will unlock.

Access control systems are commonly used in private buildings, hotels, airports, banks and other secure locations. For example, in a hotel each room is equipped with a keycard reader. The reader controls access to the room and can unlock a door if the reader detects the proper authorization code on a keycard. The authorization codes are sent to the reader by the central controller. Typically, the codes will be sent to the reader when a guest checks in. The authorization codes are customized to a particular door or doors and to particular dates or times. Typically, one code is issued for each door for each authorized time period.

In the above described access control system the reader and the central controller are fixed in location and can be directly wired to each other. However, when a target area is a temporary area or a satellite environment, the locations of the target site are not fixed and, therefore, the same process to input or download information to the reader or identification devices cannot be used.

Management of access information and control information in satellite target sites are difficult because the satellite sites or target areas are not always connected or physically present at a central location.

There is a need for an efficient solution to track or restrict access in a satellite environment, which is part of an access control system. More particularly, there is a need to be able to efficiently update a satellite database with access rights, so that only authorized personnel will be allowed to enter the satellite facility where the access rights periodically change.

BRIEF SUMMARY OF THE INVENTION

Accordingly, disclosed is an access control system that can be used to protect multiple target sites, whether fixed or satellite, which are parts of an organization or facility.

Disclosed is an access control system comprising a base station located in a stationary target site used to control access to said stationary target site and a satellite access station coupled to a satellite target site used to control access to said satellite target site. The base station includes an identification device, storage device and a transceiver. The storage device includes a master database containing a list of access information. The satellite access station includes an identification device, a storage device, and a transceiver. The storage device includes a satellite site database containing a list of access information for the satellite target site. The master database contains a list of access information for each satellite access station.

Information contained in the master database for a particular satellite access station is provided to the particular satellite access station and stored in said satellite site database.

The information is provided to the particular satellite access station when the particular satellite access station is in close proximity to the base station. The base station transmits the information to the particular satellite access station.

The system further comprises an access card. The base station provides information related to a particular satellite access station to the access card, as an intermediary. When the access card is provided to the particular satellite access station, the information is detected by the particular satellite access station and selectively stored in the satellite site database.

Also disclosed is a method for configuring a satellite access device to control access to a satellite site. The method includes the steps of broadcasting periodically a position beacon of a base station, transmitting a signal from the satellite access device to the base station when the satellite access device receives the position beacon, authorizing the satellite access device using a unique identification code, and transmitting to the satellite access device updated access information for the satellite site. The information is only transmitted to the satellite access device if the device is authorized. The satellite access device updates a database with the information.

DETAILED DESCRIPTION OF THE INVENTION

Figure 1:
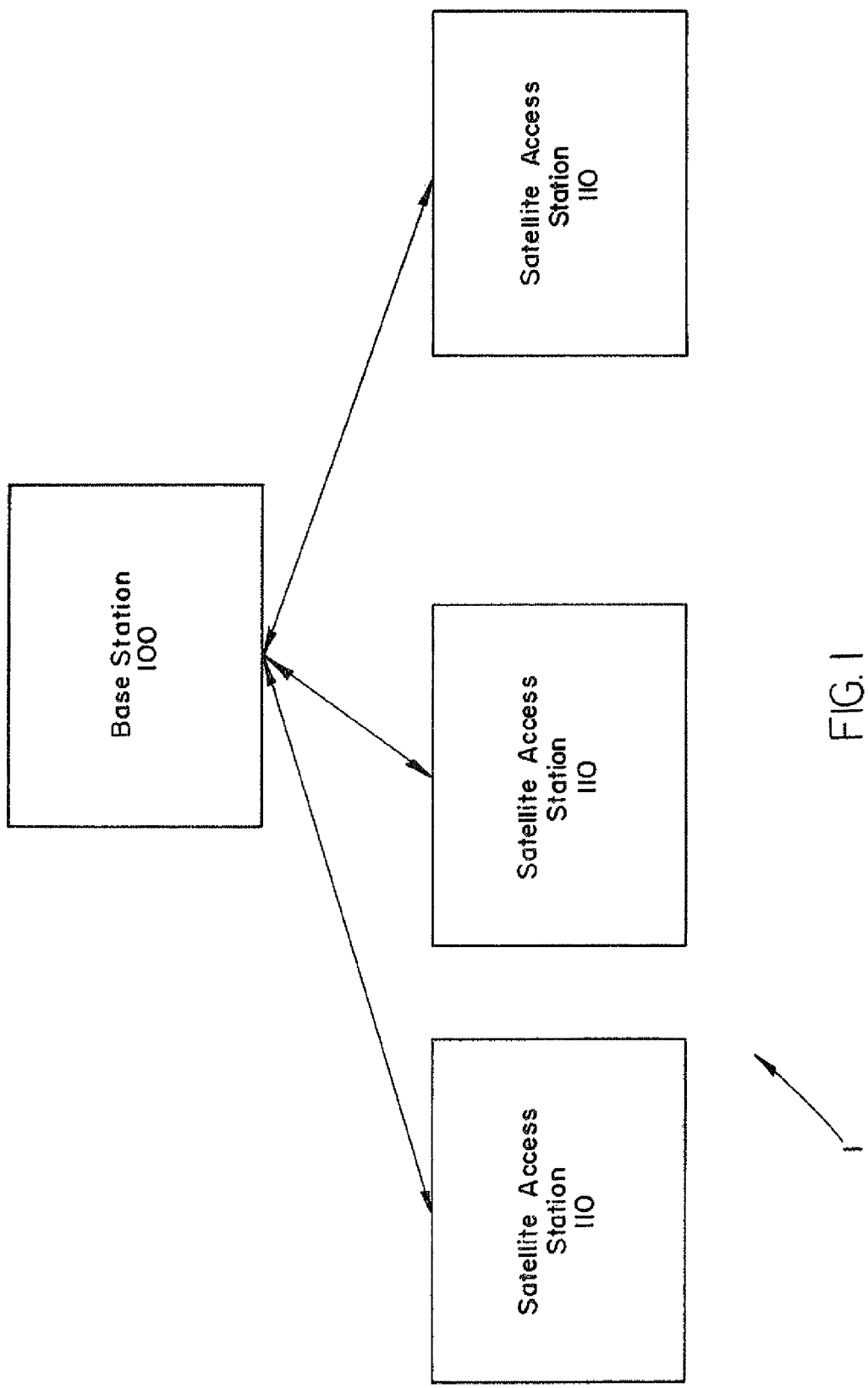
FIG. 1 illustrates an access control system according to the first embodiment of the invention.

FIG. 1 illustrates an access control system, indicated generally by the number 1, according to the present invention. The access control system 1 is an integrated access control system. The access control system 1 can control access to both stationary and mobile target areas. A stationary target site can be a building, an airport terminal, a subway station, stadium or arena. A mobile target site can be a moving vehicle, such as a company bus or an airport bus or a temporary site such as construction site. A fixed access station controls assess to a stationary target site. A satellite access station 110 controls access to a mobile target site. One of the fixed access stations is selected as a base station 100. A base station 100 acts as a central control unit that coordinates the activities of all access units (fixed or satellite). The base station 100 will also act as an access control unit.

Each access station, fixed or satellite is attached to an entranceway of the target site. The satellite access station is typically located remote from the base station 100. The satellite access station 110 can communicate with the base station 100.

Figure 2:
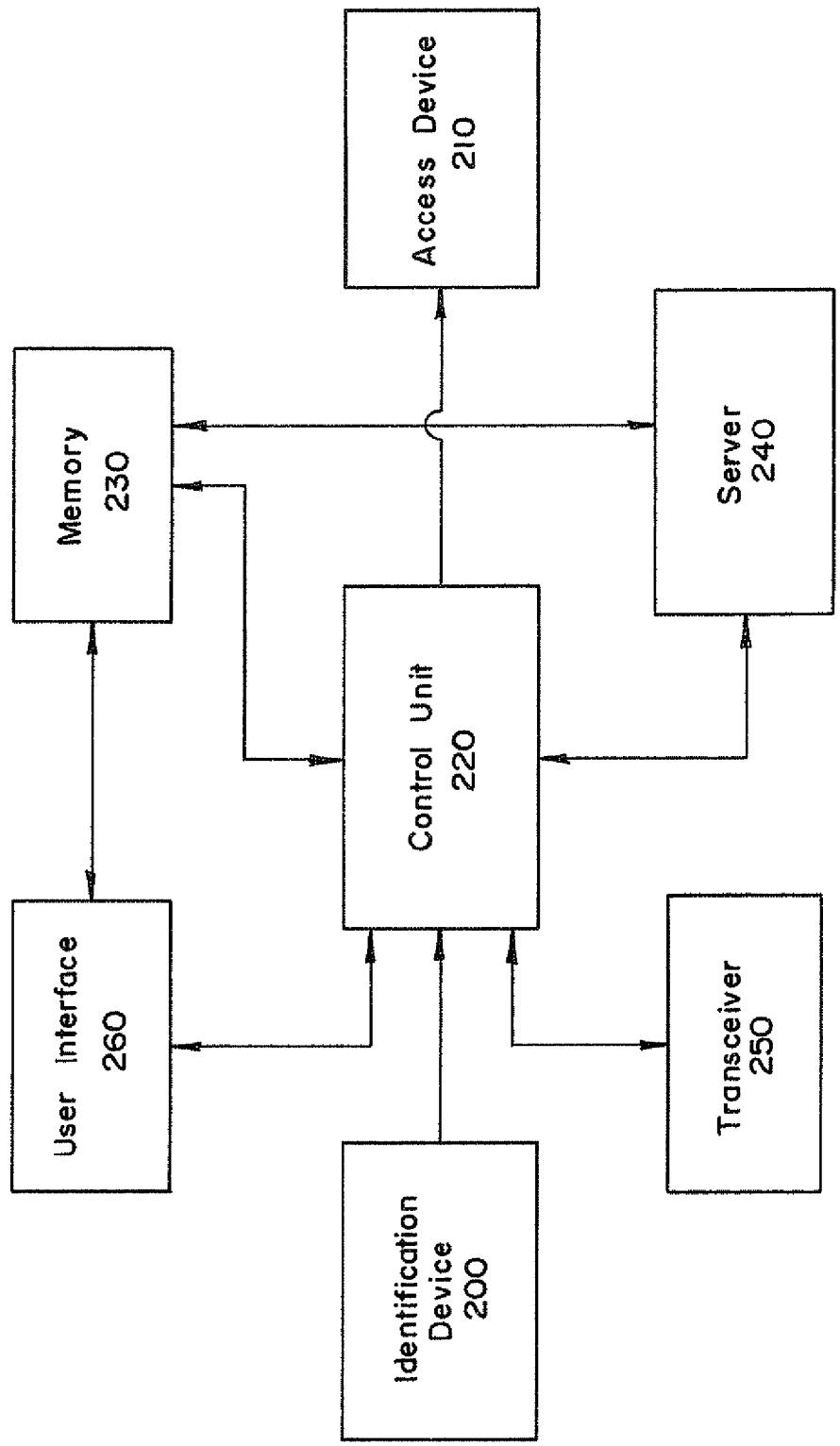
FIG. 2 is a block diagram of a base station according to the invention.

FIG. 2 illustrates a base station 100 according to the invention. The base station 100 includes an identification device 200, an access device 210, a control unit 220, a memory section 230, a server 240, a transceiver 250 and a user interface 260.

The identification device 200 acts as an input device and is used to identify a person. The identification device can be an access control reader, a card carder, a RFID reader, a biometric reader, a video base reader, a motion sensor or any other reader, which is capable of detecting a unique identity. The access device 210 is an output device that prevents or restricts entry. The access device 210 can be a magnetic or electric door contact or a turnstile. The control unit 220 controls the identification device 200 and access device 210. The control unit 220 also controls and coordinates data exchange between base station, other fixed stations and the satellite access stations 110. The control unit 220 is programmed with software for configuring, controlling, managing and commanding the access control system. The control unit 220 can be a microprocessor.

The memory section 230 is capable of storing user information, security credentials, access control permission levels, and unique identifications related to the satellite access stations 110. The information is stored as a database. The term "database" is meant to encompass any type of data storage resource, regardless of how configured or organized. The security credentials will depend on the type of identification device 200. For example, if the identification device 200 is a card reader, the security credential will be a passcode. However, if the identification device is a biometric reader, a biometric template will be stored in the memory section 230.

The server 240 controls and manages all networking functions of the access control system 1. The server 240 maintains a table containing a list of satellite access stations within the access control system 1 and its connection status. A connection status is connected or disconnected with the base station 100. When a satellite access station 110 enters a communication range of the base station 100, the satellite access station's status is connected. When a satellite access station 110 leaves the communication range of the base station 100 or is not in communication range, the connection status is disconnected.

A transceiver 250 is used to transmit and receive signals from the satellite access stations 110 and other fixed access stations.

The transceiver 250 can be a wired or wireless transceiver. The transceiver 250 will function in half duplex mode with the receiver off when the transmitter is on and vice versa.

The user interface 260 allows a person to manually enter the user information, security credentials, access control permission levels, and unique identifications into the base station 100 for storage. The user can enter the security credentials and access control permission levels for the base station 100 and all satellite access stations 110. Alternatively, the security credentials and access control permission levels can be entered using the identification device 200 to avoid any manual input. The security credentials, and access control permission levels will be transmitted to the satellite access stations 110 using the transceiver 250.

The user interface 260 can include a user input component such as a keypad, microphone, a touch screen and a personal computer. The user interface 260 can be a dedicated keypad co-located with the base station 100 or a workstation in communication with the base station 100.

Figure 3:
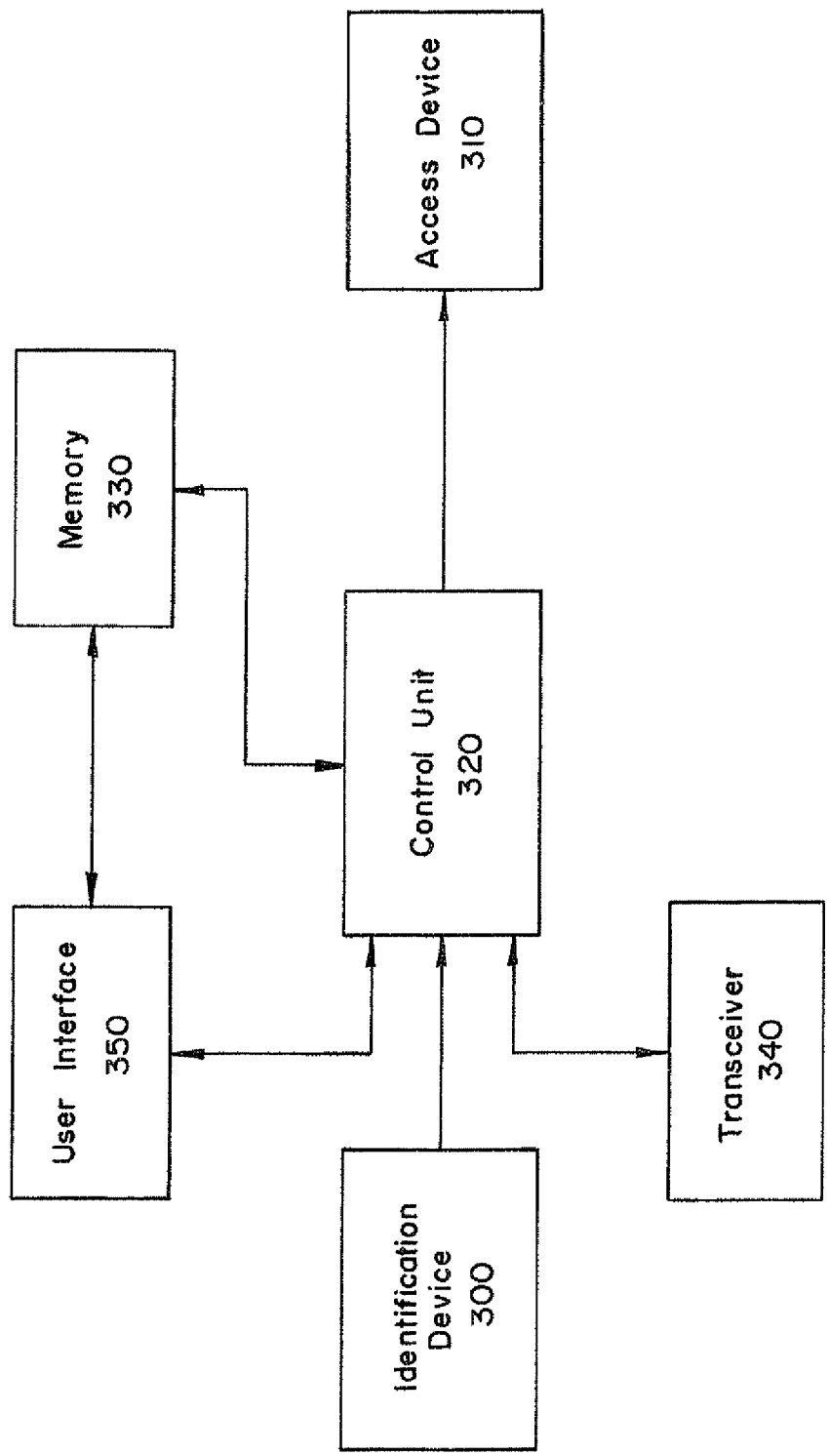
FIG. 3 is a block diagram of a satellite access station according to the invention.

FIG. 3 illustrates a block diagram of a satellite access station 110 according to the invention. Many of the components of a satellite access station 110 and the base station 100 are similar and will not be described in detail again. The satellite access station 110 includes an identification device 300, an access device 310, a control unit 320, memory section 330 and a transceiver 340. The satellite access station 110 can optionally include user interface 350. However, the identification device and access device does not have to be the same for the base station 100 and the satellite access stations 110. For example, the base station 100 can use a card reader as the identification device 200 and the satellite access station 110 can use a fingerprint detector as the identification device 300. Additionally, each satellite access station 110 can use a different identification device 300. For example a first satellite access station 110 can use a fingerprint detector and a second satellite access station 110 can be a card reader. The type of identification device will depend on the level of security needed. Additionally, each satellite access station 110 can include more than one identification device 300.

Each portion of the access control system 1 is configured to be integrated into a single access control system. This configuration process includes defining each portion of the access control system 1 as either a fixed or satellite access station, selecting a base station 100 from the fixed access station and installing the security management software into each station. Each station is also assigned a unique station identifier. The unique identifier is transmitted to the base station 100 to identity the station 100. The unique identifier can be assigned at installation of the stations or when a station first communicates with the base station. The server 240 assigns the unique identifier.

The unique identifier is generated based upon the type of station, i.e., fixed or satellite. One of the fixed stations is selected to be the base station 100. The selection of the base station 100 can be based upon the location of the station relative to the other fixed stations and potential satellite access stations 110.

Once selected, the base station 100 is assigned a unique identifier and indicating that it is the base station 100 for the access control system 1. The particular format for the unique identifier is dependent on the communication protocol. For all other stations besides the base station 100, the unique identifier includes a site region number and a unique serial number used to identify the station within a site region. The target sites are grouped into regions, each region being identified by the site region number. The regions can be divided based upon zip codes, area codes, cities, states or countries.

The unique serial number can be assigned in serial, i.e., the first station is assigned 1, and the second station is assigned 2 and so forth. Alternatively, a random number can be assigned to a station using a random number generator. Once the server 240 assigns the unique identifier, the unique identifier is stored in a database in memory 230 and in the server 240.

In one embodiment, this unique identifier is used as an address for sending data. For example, if the access control system uses IP protocol, the unique identifier can be an IP address, which is selected based upon the aforementioned criterion. Alternatively, a separate IP address can be assigned to each station and associated with the unique identifier.

During the configuration process, the base station transceiver 250 can be configured to adjust a power level of the signal to control the range of the signal. In operation, the transceiver 250 will periodically broadcast a signal. This signal will be a low power signal used by the satellite access stations 110 as a location beacon for the base station 100. If the satellite access stations 110 detect the signal, i.e., receives the signal, the satellite access stations 110 know that they are within radio range of the base station 100.

Figure 4:
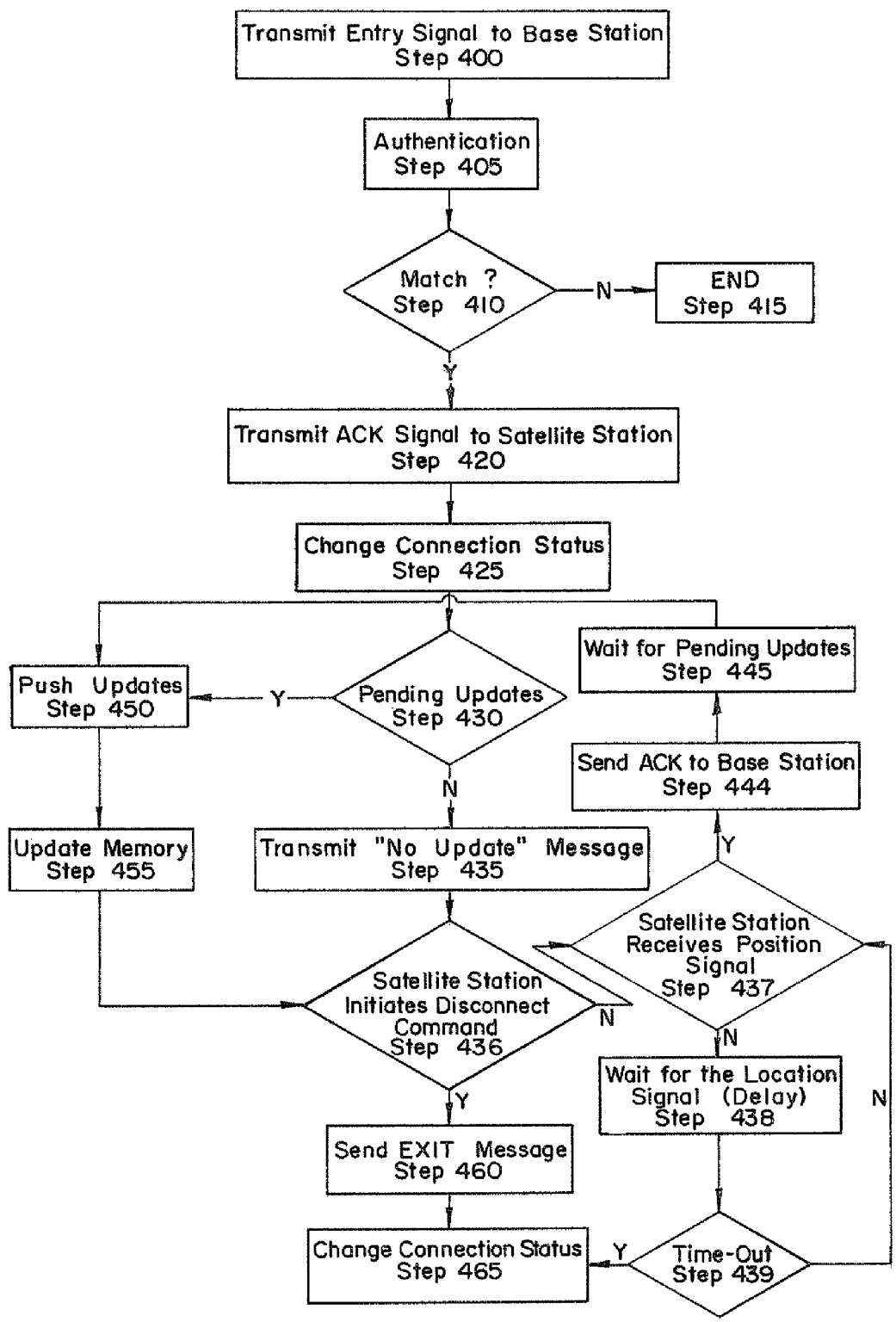
FIG. 4 illustrates a flow diagram of a process of updating the satellite access station according to the first embodiment of the invention.

FIG. 4 illustrates a flow chart for the communication procedure between the base station 100 and the satellite access station 110 when the satellite access station is within radio range of the base station 100.

At step 400, upon receipt of the position beacon from the base station 100, a satellite access station 110 transmits a unicast message indicating that the satellite access station 110 has entered radio range of the base station 100. The message is a unicast message that can be received by the intended recipient, i.e., base station 100. The "Entry" message will include the unique identifier for the satellite access station 110. The unique identifier will be used as part of the authentication process.

The base station 100 will receive the "Entry" message and open the message. At step 405, the server 240 will authenticate the satellite access station 110. The server 240 will extract from the "Entry" message the unique identifier and match the unique identifier with a list of unique identifiers prestored in a database, step 410. If no match is found, the process will end and the satellite access station 110 will not receive any updates (step 415). Optionally, the server 240 can generate a notification indicating an unauthorized access. In this case, the base station 100 can transmit a unicast message to the satellite access station 110 indicating that access is denied.

If the server 240 determines that the unique identifier matches one of the prestored identifiers, authentication is successful and the process proceeds to step 420. The base station 100 will then transmit a unicast message to the satellite access station 110 acknowledging the satellite access station 110. The server 240 will also update the status table for the particular satellite access station 110 to an "online" or "connected" status, step 425. Once the connection is established the base station 100 will check to see if there are any pending data updates for the particular satellite access station 110, at step 430. A pending data update will be stored and indexed by the unique identifier in memory 230. If there are no pending updates in memory 230, the base station 100 will send a message to the satellite access station 110 indicating that there are no updates, at step 435. Upon receipt of the "no update" message, the satellite access station 110 performs one of two functions. The satellite access station 110 can initiate a disconnection request or initiate a second update request, at step 436. A second update request is used when the satellite access station 110 has pending updates, stored in its memory 330, for the base station 100. The disconnection request is initiated when there are no pending updates stored in memory 330 for the base station 100. The pending updates stored in memory 330 can include information regarding individuals attempting to gain access to the target site, persons who gain access to the target site, time of access, all persons who left the target site and the time of departure. The disconnection process and the second update process will be described in detail later.

On the other hand, if there are pending data updates stored for the particular satellite access station 110, the pending updates will be pushed to the satellite access station 110, at step 450. This will allow for the data at the satellite access station 110 and the base station 100 to be synchronized. The pending data update can include the latest access control data as well as software updates. The access control data might be new access rights for authorized persons or to remove expired access rights for persons that are no longer authorized.

The satellite access station 110 will update its memory 330 with the data update, at step 455. Once the memory 330 updated, the satellite access station 110 can either initiate a disconnection process or a second update process, at step 436. If the satellite access station 110 initiates the disconnection process, at step 436, the satellite access station 110 transmits an "Exit" message to the base station 100, at step 460. The "Exit" message is an indication to the base station 100 that the satellite access station 110 has not pending updates and further communication is not needed. The base station 100 causes the server 240 to change the status table for the particular satellite access station 110 to "offline" or "disconnected", at step 465.

If, at step 436, the satellite access station 110, does not initiate a disconnection process, the second update process is initiated. The satellite access station 110 determines if the base station is still within communication range, at step 437. This determination is based upon a reception of a position signal from the base station 100. The position signal is similar to the location beacon described above. However, as describe above, the location beacon is broadcast to all satellite access stations 110. The position signal does not need to be broadcast to every satellite access station 110. The position signal can be a unicast message addressed only to any satellite access stations 110 that have a status of "online" or "connected". The position signal is periodically sent. The period can be adjusted during installation. If the satellite access station 110 receives the position signal, the base station 100 and satellite access station 110 are still in communication range. The satellite access station 110 sends an acknowledgement signal to the base station 100, at step 444 (ACK Signal). The ACK signal indicates that the satellite access station 110 has updates for the base station 100. The base station 100 waits for the pending updates, at step 445. At step 450, the satellite access station 110 pushes the updates to the base station 100, i.e., transmits the updates. Upon receipt of the updates from the satellite access station 110, the base station 100 stores the update information in memory 230. The information is added to the database in a record corresponding to the particular satellite access station 110. The satellite access station identifier indexes the record.

After the update is stored, the satellite access station 110 can initiate the disconnection process, at step 436. Optionally, in an embodiment, the base station 100 can transmit a confirmation message to the satellite access station 110 indicating that the update was successfully received and stored.

If, at step 437, the satellite access station 110 does not receive the position signal, the satellite access station 110 waits for the position signal for a preset period of time, at step 438. The preset period of time is adjusted and can be customized for a given system. For example, if the satellite access station 110 is protecting a moving vehicle, the period of time can be short, i.e., seconds. Additionally, the preset period of time can be related to the set interval for the location signal, e.g., three times the set interval. For example, if the position signal is transmitted every 20 seconds, the preset period of time can be one minute. The satellite access station 110 checks for the position signal for a predetermined number of times or until a predetermined "time out" has occurred, at step 439. Afterwards, the satellite access station 110 will conclude that the base station 100 is out of range. If the satellite access station 110 does not receive the position signal within the time out period or the predetermined number of times has been received, a timeout occurs.

The base station 100 concludes that a "time out" has occurred if the base station does not receive an ACK signal within the "time out" period. The base station 100 changes the connection status of the satellite access station 110, after a "time out", step 465. The server 240 updates the status table for the particular satellite access station 110 to "disconnected" or "offline". Once the satellite access station 110 is offline, the satellite access station 110 independently operates to restrict access to a target area.

The above-identified method has been described with reference to communication between the base station 100 and a satellite access station 110, however, a skilled artisan would appreciate that the same communication procedure can be used for communication between the base stations 100 and other fixed stations not selected to be the base station 100.

All signal and messages transmitted by the access control system 1, between the base station 100 and satellite access stations will be encrypted to secure communications against interception.

In one embodiment, the data can be encrypted using an Advanced Encryption Standard for high level security. A 256-bit strong encryption can be used. For medium level security a 128-bit strong encryption can be used. The type of encryption used can be determined depending on the security policy of the target site. Additionally, the type of encryption can depend on the communication protocol used. For example, if the stations are wireless and use BLUETOOTH standard, using short-range wireless links, BLUETOOTH standard includes encryption and decryption. Other types of encryption and decryption can be used such as a symmetric key known only to the satellite access stations 110 or public/private key pair. The encryption and decryption keys will be given to the satellite access stations 110 during configuration or initialization.

Figure 5:
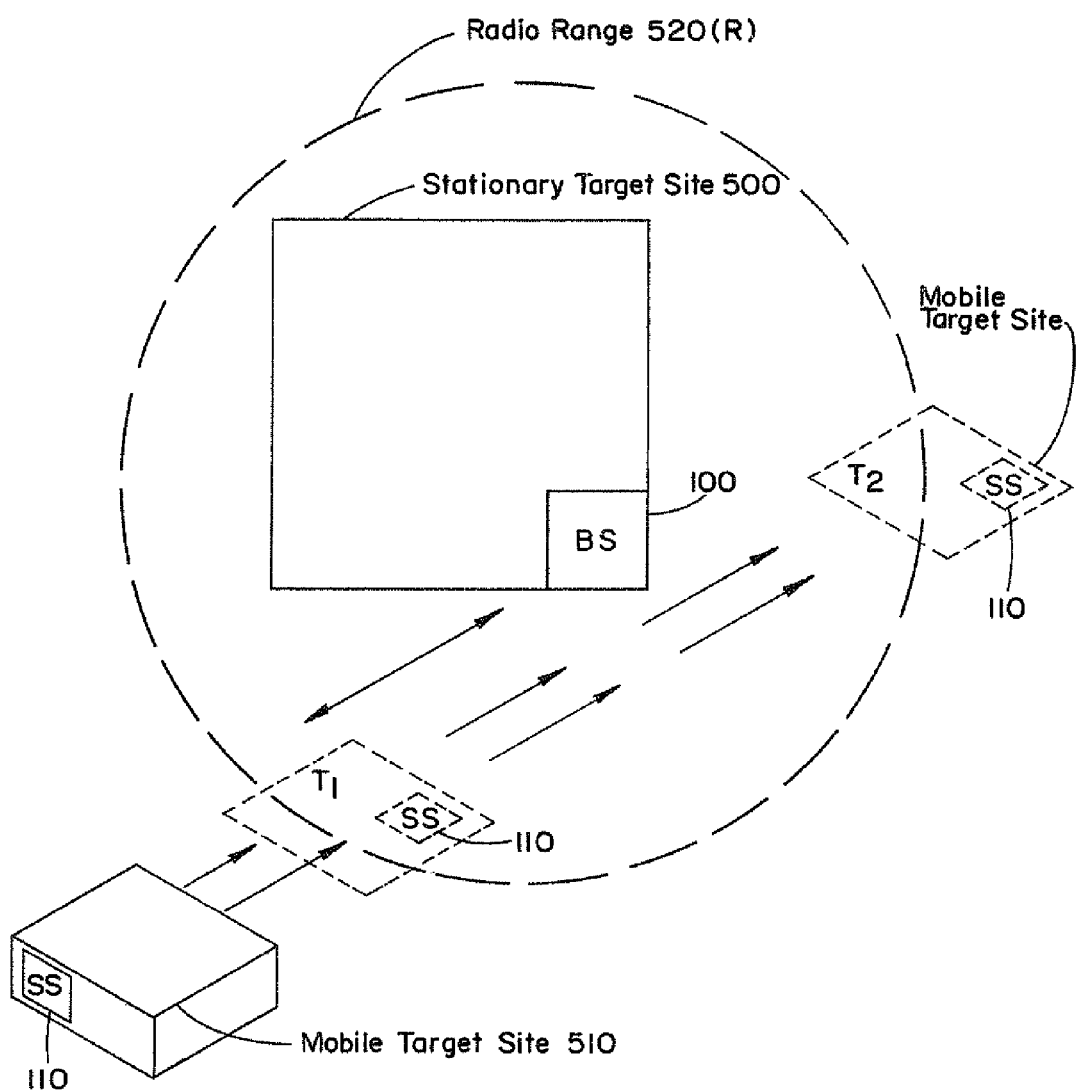
FIG. 5 illustrates an example of the first embodiment.
Figure 6:
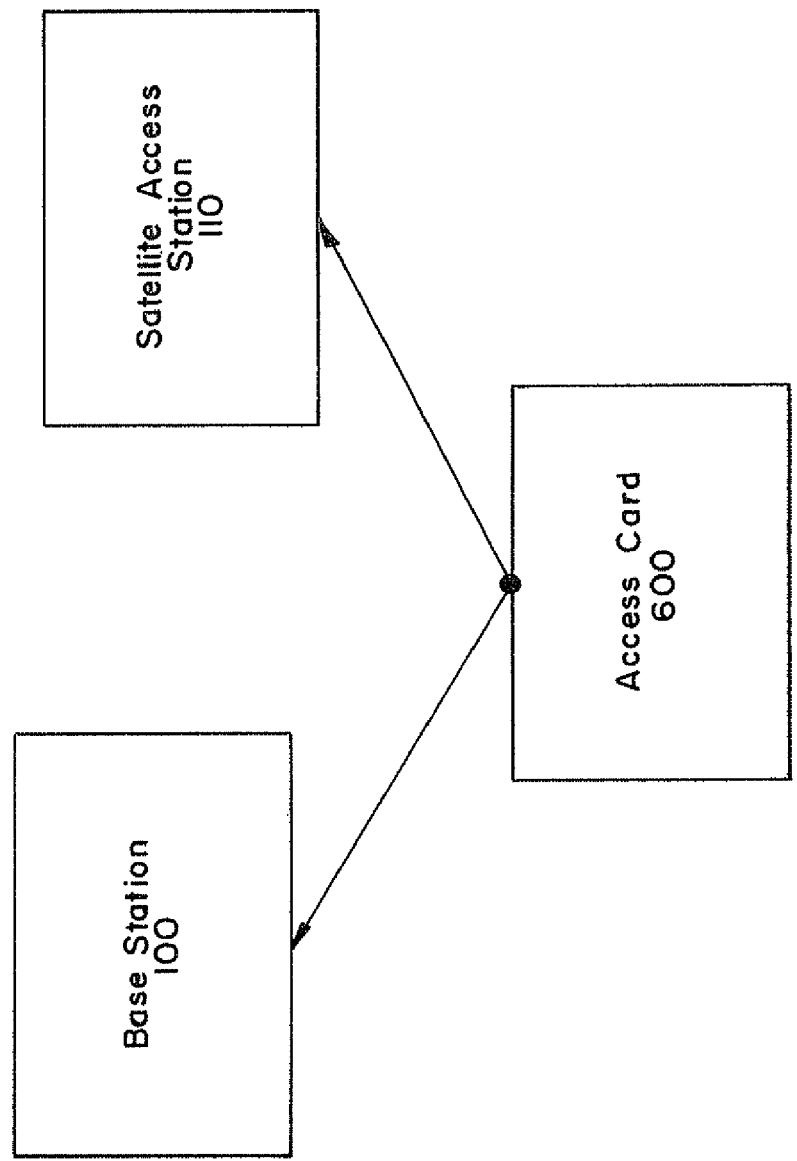
FIG. 6 illustrates an access control system according to the second embodiment of the invention.

FIG. 5 illustrates an example of the invention. FIG. 5 depicts a base station 100 (BS) located within a fixed target site 500. The BS 100 has radio preset communication range 520 (R). A dashed line surrounding the BS 100 represents R. A satellite target 510 equipped with a satellite access station (SS) 110 is depicted as initially being located outside R. At time T1 the satellite target moves within R and, therefore, can receive signals from the BS 100, i.e., within proximity of the BS. The BS 100 periodically broadcasts the position beacon to let all satellite access stations 110 know the location of the BS 100. For a given radio range, the BS 100 and SS 110 have a window of communication. As depicted in FIG. 5, the window of communication is the time period from T1 to T2. The window depends on the velocity of the satellite target 510 and size of the R. The size of R can be adjusted to maximize the window of communication. For example, if the access control system 1 is monitoring high speed moving devices, the size of R would be increased. Alternatively, the transmission rate of the BS 100 and SS 111 can be controlled to insure that communication is completed with the window. Additionally, the frequency of the periodic position beacon can be increased to insure that the SS 110 receives the beacon shortly after the satellite target site 510 enters R.

Once in range, the SS 110 will receive the position beacon via the transceiver 340 and transmit the "Entry" message to the BS 100. The BS will identify and authenticate the SS 110 using the unique identifier. After authentication, the server 240 will change the status of the SS 110 to "online" in the status table and transmit an acknowledge signal to the SS 110. The BS 100 will check for pending data updates in memory 230 and send all pending updates for the SS 110 as an encrypted message to the SS 110. Using a predetermined decryption key, the SS 110 will decrypt the message and update its memory. The fact that the SS 110 can decrypt the encrypted data update, using the predetermined decryption key insures that the data was received from the BS 100 and not from another source, e.g., a hacker. After updating memory, the SS 110 will transmit the "Exit" message to the BS 100 and the status table will be changed.

While the access control method has been described as first synchronizing data that is entered and stored at the base station 100 with the data stored in the satellite access stations 110 and then synchronizing the data entered and stored in the satellite access station 110, the method can be reversed. Additionally, the method can be used only to update information either at the base station 100 or the satellite access station 110. For example, when the satellite access station 110 enters the radio range of the base station 100, the satellite access station 110 can transmit this data to the base station 100 such that the base station serves as a central repository for the access data. For example, the data can be transmitted to the base station 100, once the satellite access station 110 has received the acknowledgement signal, i.e., after step 420.

FIG. 1 illustrates the access control system 1 according to a first embodiment of the invention where the base station 100 communicates directly with the satellite access stations 110 to update the satellite access stations 110.

In the second embodiment of the invention, the base station 100 can distribute data updates with the satellite access stations without establishing a direct connection between the satellite access stations 110 and the base station 100

For purposes of the description of the second embodiment, the same reference numbers for the base station 100 and satellite access stations 110 will be used.

The access control system 1 according to the second embodiment of the invention uses an access card 600 as an intermediary between the base station 100 and the satellite access stations 110. The access card 600 can be a smart card, an RFID carder, a near field communication device, or any other access control card. The data update is copied from the base station 100 to the access card 600 from a card reader. The card reader will act as an identification device 200 as well as a writing device. The base station 100 of the second embodiment of the invention includes the same components as the base station 100 according to the first embodiment; however, the identification device includes at least one card reading device capable of reading and writing information from and to and access card 600.

The base station 100 and satellite access stations 110 are configured and initialized in the same fashion as in the first embodiment. Each station is assigned a unique identifier, given an encryption and decryption key, and has security software installed. One of the stations is selected as the base station 100. All of the unique identifier is stored in memory 230 in the base station 100. Since a unique identifier identifies each station, access rights to each station can be individually entered and coordinated with each station using the unique identifier as an index. Each time new data is added to the system, it is indexed by the unique identifier and added to an information database. The base station 100 modifies the database to include the new information, e.g. adds access rights or deletes access rights, and adds the changes to a pending queue database indexed by the unique identifier. The pending Queue database is used by the base station 100 to determine if there are any data updates to be sent to a satellite access station 110

Data can only be copied to access cards that are authorized to access the satellite target site. In other words, only access cards 600 having an authorized access code will have any data update writing to the card.

Figure 7A:
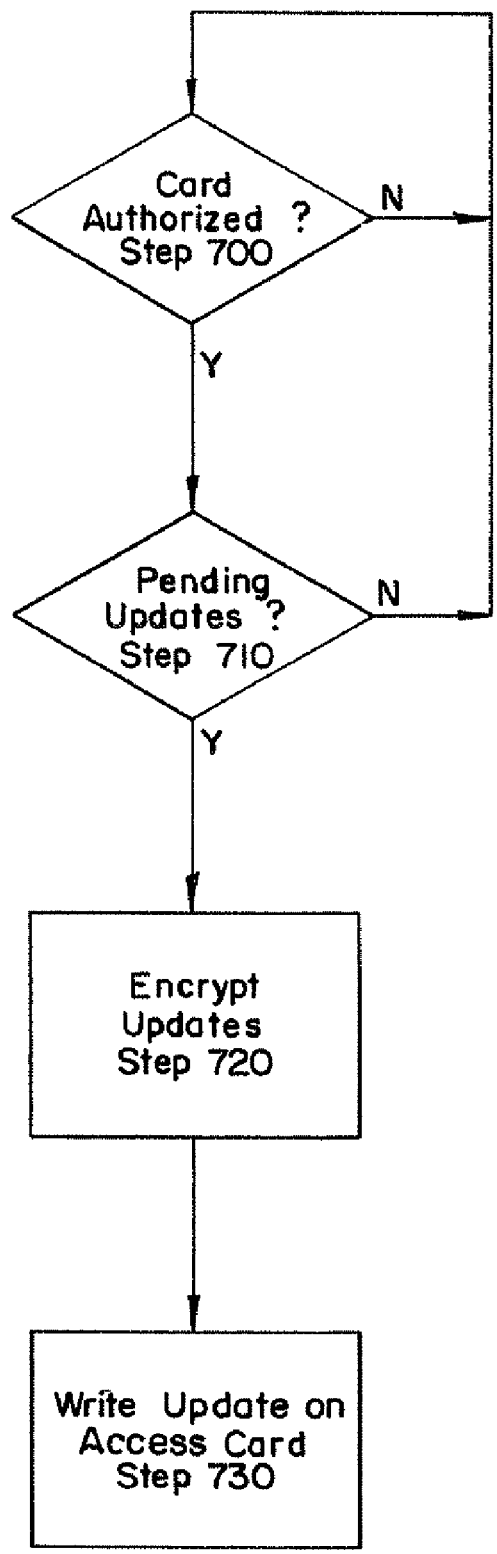
FIGS. 7a and 7b illustrate flow diagrams of a process of updating the satellite access station according to the second embodiment of the invention.
Figure 7B:
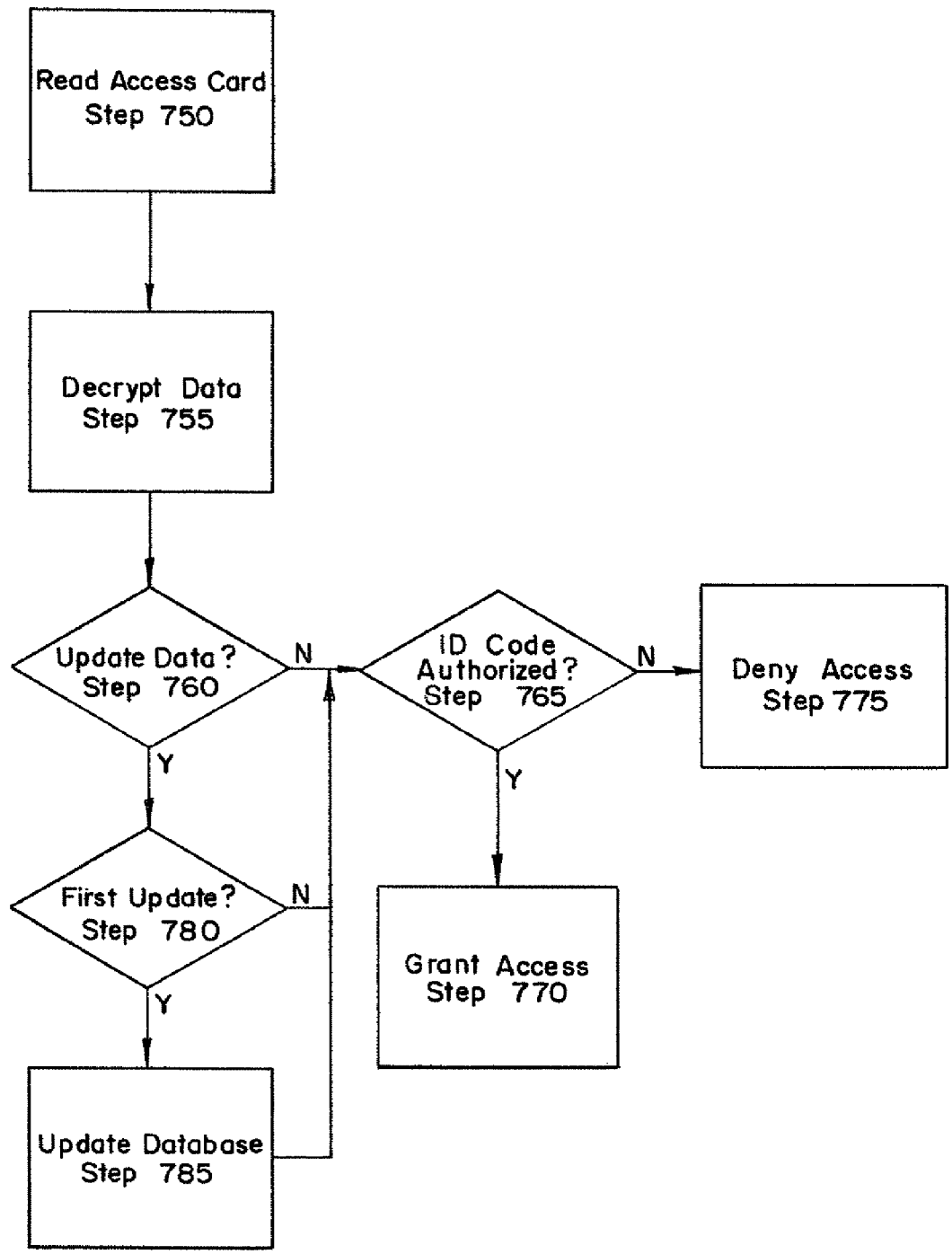

FIGS. 7a and 7b illustrate a control method according to the second embodiment of the invention. FIG. 7a illustrates steps that occur at the base station 100 and FIG. 7b illustrates steps that occur at the satellite access station 110.

At step 700, the base station 100 determines if the access card 600 is authorized to receive any updates. The access card 600 is read by identification device 200. The identification device 200 determines the access code and the particular satellite access station(s) to which the access code corresponds. The same access code can be used to access multiple satellite target sites through different satellite access stations 110. The base station 100 searches the database, in memory 230, for the determined access code and satellite access station 110. If the access card 600 is authorized for at least a satellite target site, i.e., at least one satellite access station 110, the base station 100 will then determine if there are any pending data updates in the pending queue database, at step 710. If the access card 600 is authorized for more than one satellite access stations 110, the base station 100 will look for data updated for each satellite access station 110. If the access card 600 is not authorized for any satellite access station 110, the base station 100 will not perform the search.

If there are no updates, then the update process ends. Optionally, the base station 100 can notify the operator that there are no updates.

If there are updates, the base station 100, using a predetermined encryption key, at step 720, will encrypt the data updates. The encrypted data update is "written" to the access card 600, at step 730. The manner in which the data updates are written to the access card will depend on the type of card. For example, the data update can consist of encrypted numbers that have been magnetically written onto a normal magnet swipe card. Alternatively, the update data can consist of encrypted data that is stored in a memory section of the record devices. If a different encryption key is used to encrypt the data update, the base station 100 can also write or store the encryption key on the access card 600.

The access card 600 is then transferred to the satellite access station 110$_n$ and read by an identification device 300, at step 750. The data stored or written on the access card 600 will be "dumped" to the identification device 300. The satellite access station 110$_n$ will decrypt the data, at step 755, using either a preset decryption key stored in memory or the new decryption key encoded in the access card 600.

After all of the data is decrypted, the satellite access station 110$_n$ determines if there is any data update, at step 760. If there is no update data, the identification device 300 will determine if the identification encoded in the access card 600 is authorized, i.e., matched an identification prestored in memory, at step 765. If there is a match, at step 765, access will be granted at step 770. If there is no match, access will be denied at step 775.

If at step 760, the satellite access station 110 determines that there is data update, then the identification device 300 will determine if the satellite access station 110 already received the data update from another access card 600 or directly from the base station 100. Only the first time that the update data is detected and received, is the data stored in memory and added to the database. Each successive time, the update data is ignored. Multiple access cards 600 can contain the same data update.

If the data update is already added, the identification device 300 will proceed to the access control process, i.e., steps 765-775.

If the data update has not been added, the satellite access station 110$_n$ device 300 will cause the update data to be stored in memory and added to the database. After the data is added, the identification device 300 will proceed to the access process, i.e., steps 765-775.

According to the second embodiment, the access information can be synchronized in both the satellite access stations 110 and the base station 100 without having a direct connection between them.

While the first and second embodiments have been described separately, a combination of the two can be used. For example, when the satellite access stations 110 are in radio range of the base station 100 the first embodiment can be used. However, if the satellite access stations 110 and their corresponding satellite devices are not in radio range, the second embodiment can be used such that the satellite access stations 110 can always receive the update data.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. An access control system comprising:
at least one mobile satellite target site defined in part by a motor vehicle with an externally mounted satellite access station for controlling human access to said satellite target site, said satellite access station includes an first identification device, a first storage device and a first transceiver, said first storage device includes a satellite site database containing a list of access information for said satellite target site, and
a stationary base station said base station includes an identification device, storage device and a transceiver, said storage device includes a master database containing a list of access information for each of said at least one satellite access stations, wherein each of the at least one mobile satellite target sites detects when it is within radio range of the base station whereby information contained in said master database for each particular satellite access station including at least identifiers of a plurality of persons authorized to access the particular satellite station is provided to said particular satellite access station and the identifiers of the plurality of persons are stored in said satellite site database whereby the identifiers are independently used by the particular satellite station to restrict access to persons authorized to access the particular satellite station both when the satellite station is within radio range of the base station and also when the satellite station is beyond radio range of the base station wherein the at least one mobile satellite station periodically detects that it is within radio range of the stationary base station based upon a reception of a position signal from the stationary base station and enters a connected state the at least one mobile satellite station then sends an acknowledgement signal and updates to the stationary base station to be stored in memory of the stationary base station and upon detecting that the at least one mobile satellite station is out of range of the stationary base station based upon not receiving the position signal from the stationary base station in a predetermined period of time, the at least one mobile satellite station enters a disconnected state where the at least one mobile satellite station operates to restrict access to a target area independently of the stationary base station.

2. The access control system of claim 1, wherein said information is provided to the particular satellite access station when said particular satellite access station is in close proximity to said base station, said base station transmits said information to said particular satellite access station.

3. The access control system of claim 1, further comprising an access card, wherein said base station provides information related to each particular satellite access station to said access card, as an intermediary, and when said access card is provided to said particular satellite access station, said information is detected by said particular satellite access station and selectively stored in said satellite site database.

4. The access control system of claim 1, wherein said satellite access station is identified by a unique identification code.

5. The access control system of claim 2, wherein said base station periodically broadcasts a location beacon used by said satellite access station to determine a relative location of said base station and said satellite access station.

6. The access control system of claim 2, wherein prior to transmission of said information to said particular satellite access station, said base station identifies said satellite access station by said unique identification code to authenticate said particular satellite access station.

7. The access control system of claim 1, wherein said base station further comprises a user interface for entering access information for all satellite access stations.

8. A method of configuring a mobile satellite access device defined in part by a motor vehicle to control access to a satellite site comprising the steps of:
   broadcasting periodically a position beacon of a base station;
   the mobile satellite access device of the motor vehicle detecting that it is within radio range of the base station;
   transmitting a signal from the mobile satellite access device to the base station when said satellite access device receives said position beacon;
   authorizing said satellite access device to enter a connected state with the base station using a unique identification code;
   transmitting to said satellite access device updated access information for said satellite site including identifiers of a plurality of persons authorized to enter the motor vehicle, said transmission is based upon said authorizing;
   updating a database at the satellite access device with said information; and
   the satellite access device of the motor vehicle periodically detects that it is within radio range of the base station based upon a reception of a position signal from the base station and enters a connected state the at least one mobile satellite station then sends an acknowledgement signal and updates to the base station to be stored in memory of the base station and upon detecting that the satellite access device of the motor vehicle is out of range of the base station based upon not receiving the position signal from the base station in a predetermined period of time, the satellite access device of the motor vehicle enters a disconnected state where the satellite access device of the motor vehicle operates to restrict access to a target area independently of the base station.

9. The method of configuring a satellite access device according to claim 8, further comprising the step of: maintaining a connection status database for the satellite access device indicating a connection status for said satellite access device.

10. The method of configuring a satellite access device according to claim 8, wherein said updated access information is encrypted.

* * * * *